(12) United States Patent  (10) Patent No.: US 6,978,221 B1
Rudy  (45) Date of Patent: Dec. 20, 2005

(54) COMPUTERIZED DIETETIC SCALE

(76) Inventor: Richard J. Rudy, 4030 Irongate Rd., Bellingham, WA (US) 98226-8028

( * ) Notice: Subject to any disclaimer, the term of this patent is extended or adjusted under 35 U.S.C. 154(b) by 65 days.

(21) Appl. No.: 10/645,291

(22) Filed: Aug. 20, 2003

Related U.S. Application Data

(60) Provisional application No. 60/404,909, filed on Aug. 20, 2002.

(51) Int. Cl.$^7$ .......................... G06F 15/00; G01G 19/00
(52) U.S. Cl. ...................... 702/173; 702/176; 702/177; 702/182
(58) Field of Search ............................... 702/127, 173, 702/176, 177, 182, 186; 177/25.16, 25.1; 128/920, 921

(56) References Cited

U.S. PATENT DOCUMENTS 4,891,756 A * 1/1990 Williams, III ............... 708/132
6,040,531 A * 3/2000 Miller-Kovach et al. ........................ 177/25.16
2002/0124017 A1 * 9/2002 Mault ......................... 707/509

* cited by examiner

Primary Examiner—Bryan Bui
(74) Attorney, Agent, or Firm—Todd N. Hathaway

(57) ABSTRACT

A dietetic scale and method for calculating and tracking nutritional content information. The scale includes a bar code reader for identifying a food product from its package, with food content data per unit weight of the product being retrieved from a database. The database is a compilation of standardized nutrition facts promulgated by the FDA or other authority for the food products, with the bar code being correlated with the food products by means of their individual UPC numbers. The scale cumulatively sends the nutritional content data for servings of food products consumed over a predetermined interval of time, and then compares the summed values with a predetermined goal that includes minimums and maximums for selected contents. The information may be outputted to a digital flashcard or other electronic storage media for subsequent retrieval and analysis.

27 Claims, 8 Drawing Sheets

| Mode | Manual |
|---|---|
| Food Code / UPC Code | |

✂ indicates items to limit ♥ indicates items to acquire

| Nutrient Category | Content Per Unit Serving | Content Per Weighed Serving |
|---|---|---|
| Serving Size (g) | | 0 |
| Total Calories | | 0 |
| Calories From Fat ✂ | | 0 |
| Total Fat (g) ✂ | | 0 |
| Saturated Fat (g) ✂ | | 0 |
| Cholesterol (mg) ✂ | | 0 |
| Sodium (mg) | | 0 |
| Total Carbohydrate (g) | | 0 |
| Dietary Fiber (g) ♥ | | 0 |
| Sugars (g) | | 0 |
| Protein (g) ♥ | | 0 |
| Vitamin A (%) ♥ | | 0 |
| Vitamin C (%) ♥ | | 0 |
| Calcium (%) ♥ | | 0 |
| Iron (%) ♥ | | 0 |

FIG. 3

| Mode | Manual |
|---|---|
| Food Code / UPC Code | |

✂ indicates items to limit   ♥ indicates items to acquire

| Nutrient Category | Content Per Unit Serving | Content Per Weighed Serving |
|---|---|---|
| Serving Size (g) | 228 | 0 |
| Total Calories | 250 | 0 |
| Calories From Fat  ✂ | 110 | 0 |
| Total Fat (g)  ✂ | 12 | 0 |
| Saturated Fat (g)  ✂ | 3 | 0 |
| Cholesterol (mg)  ✂ | 30 | 0 |
| Sodium (mg) | 470 | 0 |
| Total Carbohydrate (g) | 31 | 0 |
| Dietary Fiber (g)  ♥ | 0 | 0 |
| Sugars (g) | 5 | 0 |
| Protein (g)  ♥ | 5 | 0 |
| Vitamin A (%)  ♥ | 4 | 0 |
| Vitamin C (%)  ♥ | 2 | 0 |
| Calcium (%)  ♥ | 20 | 0 |
| Iron (%)  ♥ | 4 | 0 |

FIG. 5

| Mode | Manual |
|---|---|
| Food Code / UPC Code | |

✂ indicates items to limit    ♥ indicates items to acquire

| Nutrient Category | Content Per Unit Serving | Content Per Weighed Serving |
|---|---|---|
| Serving Size (g) | 228 | 159 |
| Total Calories | 250 | 175 |
| Calories From Fat  ✂ | 110 | 77 |
| Total Fat (g)  ✂ | 12 | 8 |
| Saturated Fat (g)  ✂ | 3 | 2 |
| Cholesterol (mg)  ✂ | 30 | 21 |
| Sodium (mg) | 470 | 329 |
| Total Carbohydrate (g) | 31 | 22 |
| Dietary Fiber (g)  ♥ | 0 | 0 |
| Sugars (g) | 5 | 4 |
| Protein (g)  ♥ | 5 | 4 |
| Vitamin A (%)  ♥ | 4 | 3 |
| Vitamin C (%)  ♥ | 2 | 1 |
| Calcium (%)  ♥ | 20 | 14 |
| Iron (%)  ♥ | 4 | 3 |

FIG. 6

| User | |
|---|---|
| | 1 |

✂ indicates items to limit
♥ indicates items to acquire

| Nutrient Category | Daily Recommended Limit/Requirement | Daily Total Content | Remaining Daily Amount Allowed/Required |
|---|---|---|---|
| Total Calories | 2000 | 0 | 2000 |
| Calories From Fat ✂ | N/A | 0 | N/A |
| Total Fat (g) ✂ | 65 | 0 | 65 |
| Saturated Fat (g) ✂ | 20 | 0 | 20 |
| Cholesterol (mg) ✂ | 300 | 0 | 300 |
| Sodium (mg) ✂ | 2400 | 0 | 2400 |
| Total Carbohydrate (g) | 300 | 0 | 300 |
| Dietary Fiber (g) ♥ | 25 | 0 | 25 |
| Sugars (g) | N/A | 0 | N/A |
| Protein (g) | N/A | 0 | N/A |
| Vitamin A (%) ♥ | 100 | 0 | 100 |
| Vitamin C (%) ♥ | 100 | 0 | 100 |
| Calcium (%) ♥ | 100 | 0 | 100 |
| Iron (%) ♥ | 100 | 0 | 100 |

FIG. 7

User | 1
--- | ---

✂ indicates items to limit  ♥ indicates items to acquire

| Nutrient Category | Daily Recommended Limit/Requirement | Daily Total Content | Remaining Daily Amount Allowed/Required |
|---|---|---|---|
| Total Calories | 2000 | 175 | 1825 |
| Calories From Fat ✂ | N/A | 77 | N/A |
| Total Fat (g) ✂ | 65 | 8 | 57 |
| Saturated Fat (g) ✂ | 20 | 2 | 18 |
| Cholesterol (mg) | 300 | 21 | 279 |
| Sodium (mg) ✂ | 2400 | 329 | 2071 |
| Total Carbohydrate (g) | 300 | 22 | 278 |
| Dietary Fiber (g) ♥ | 25 | 0 | 25 |
| Sugars (g) | N/A | 4 | N/A |
| Protein (g) | N/A | 4 | N/A |
| Vitamin A (%) ♥ | 100 | 3 | 97 |
| Vitamin C (%) ♥ | 100 | 1 | 99 |
| Calcium (%) ♥ | 100 | 14 | 86 |
| Iron (%) ♥ | 100 | 3 | 97 |

FIG. 8

COMPUTERIZED DIETETIC SCALE

This application claims the benefit of U.S. Provisional Application No. 60/404,909, filed 20 Aug. 2002.

BACKGROUND OF THE INVENTION a. Field of the Invention

The present invention relates generally to dietetic measurement apparatus, and, more particularly, to a computerized dietetic scale for weighing, calculating, and cumulatively storing the nutritional content of a person's daily food intake and for comparing it to recommended daily limits/requirements.

b. Background Art

It is common knowledge among nutritionists, health professionals, and even most lay people that general health can be linked to dietary habits. For instance, eating too many calories can lead to overweight and obesity, and eating too much fat or sodium may increase your risk of certain chronic diseases, such as heart disease, some cancers, or high blood pressure. In general, Americans often do not get enough dietary fiber, vitamin A, vitamin C, calcium, and iron in their diets. Eating enough of these nutrients can improve one's health and help reduce the risk of some diseases and conditions. For example, getting enough calcium can reduce the risk of osteoporosis, in which bones become brittle and break as one ages.

The connection between dietary consumption and health is clear, and, as these examples illustrate, limiting certain food elements and acquiring sufficient quantities of others can help maintain good health. However, it remains a difficult and inconvenient task to monitor the calories and nutrients contained in the foods one consumes on a daily basis. In the past, health conscious individuals and those with dietary restrictions had to determine the nutritional content of a given meal by weighing each individual food item, consulting reference charts which tabulate the contents of various foods, and then mentally or manually calculating the total caloric and substantive content in the meal. Not only was the procedure burdensome and time consuming, but also many food items, such as processed and canned goods, were not listed in the food reference charts.

In an effort to make this task easier, the Food and Drug Administration (FDA) has regulated food labeling requirements, which are mandatory on most prepared foods, such as breads, cereals, canned and frozen foods, snacks, etc. Under the label's "Nutrition Facts" panel, manufacturers are required to provide information on certain food content and nutrients, as well as recommended daily nutrient and caloric input as proposed by the FDA, and present them in a standard format. While these "Nutrition Facts" labels provide additional information for the consumer, the task of measuring and calculating the total intake of individual food elements remains. In addition, nutrition labeling for raw produce such as fruits, vegetables, fish, etc. is voluntary. Thus, additional reference material is still required to determine the food content of these "conventional" foods.

Numerous dietetic measurement devices appear in the prior art which are aimed at simplifying the calorie and nutrient accounting process. Many of these devices are self-described "dietetic calculators" which allow mathematical manipulation of stored food content data by pressing the correct sequence of data retrieval and mathematical function buttons. While these devices eliminate the need for paper and pencil calculations, they are still very complex and time consuming to use.

Other dietetic measurement devices incorporate electronic scales for weighing the food, memory modules for retrieving the nutrient data, and logic algorithms which manipulate the data automatically. The primary problem with these devices is that they rely on categorized groupings of "conventional" foods to access the food content data. For instance, a pre-assigned button, or cascading menu may allow the data for poultry to be accessed. However, for processed foods, such as canned soup, the data would not be available. Without the complete nutritional information for a meal, the calorie and nutrient calculation becomes compromised. Even if the data for processed foods were stored on the device, the immense variety of processed foods would make finding and retrieving the information very difficult. In addition, thousands of new processed food items are introduced to market every day. For these items, the nutrient data would not be available in the device's memory.

Most of the dietetic measuring devices found in the prior art provide an incomplete list of contents for each food item. For instance, calories, carbohydrates, and protein are commonly listed; however, vitamins and minerals are commonly neglected. In addition, most of these devices only display the content for a single item or accumulation of items, but provide no information on the status concerning total daily intake requirements.

Accordingly, there exists a need for a dietetic measuring device that allows simplified, rapid entry or access of food content data regardless of whether it is "conventional" or processed. Furthermore, there exists a need for such a device that provides a complete list of the caloric and nutrient content of each food item being considered. Still further, there exists a need for such a device that provides the nutrition status of the user concerning total recommended daily intake limits/requirements.

SUMMARY OF THE INVENTION

The present invention has solved the problems cited above, and is a programmable electronic scale for weighing, calculating, and cumulatively storing the nutritional content of a person's daily food intake, and provides means for evaluating the nutritional content with respect to recommended daily limits/requirements.

Broadly, the dietetic scale of the present invention comprises: A barcode reader for identifying a food product contained in a package from a bar code displayed thereon; means for retrieving predetermined food content data pulling data of the food product from a database containing predetermined food content data per unit weight for a plurality of food products; a scale for determining a measured weight of a serving of the food product obtained from the package; and means for comparing the measured weight of the serving of the food product with the predetermined foot content data for a unit weight of the food product so as to calculate a nutritional content of the serving of the food product. The means for comparing the measured weight with the predetermined food content data per unit weight may comprise an electronic memory having predetermined food content data for a plurality of food products entered therein, and the food content data may comprise a compilation of standardized nutrition facts promulgated for the food products.

The scale may still further comprise a means for cumulatively summing calculated nutritional contents of a plurality of servings of food products over a predetermined interval of time, and means for comparing the cumulatively summed nutritional contents with the predetermined goal for intake of nutritional contents that includes predetermined minimums and maximums for selected nutritional contents for the predetermined period of time.

The scale may further comprise means for manually entering the food content data for the food products, such as a manually operable key pad. In addition, the scale may comprise means for outputting at least the differences between the summed nutritional contents and the maximum and minimums of the predetermined goal to electronic storage media for subsequent retrieval and analysis, such as digital flashcard media.

The bar code reader may comprise a bar code scanner mounted in a wand or a stationary scanner mounted behind the window in the housing of the scale.

The present invention also provides a method for calculating a nutritional content of a serving of a food product, the method comprising the steps of: Scanning a bar code on a package so as to identify a food product contained therein; retrieving predetermined food content data per unit weight of the food product from the database containing predetermined foot content data per unit weight for a plurality of food products; weighing a serving of the food product from the container so as to determine a measured weight of the serving; and comparing the measured weight of the serving of the food product with the predetermined foot content data per unit weight of the food product so as to calculate weight a nutritional content of the serving of the food product. The database contains predetermined food content data per unit weight for a plurality of food products and may comprise a compilation of standardized nutrition facts promulgated for the food products.

According to a preferred embodiment the invention includes (a) a computer means, comprising a central processing unit (CPU) for manipulating and performing calculations on the food content data, and a memory, connected to the CPU which provides storage for food content data, instructions for manipulating the data, and the processed results of that data, (b) an input/output (I/O) means connected to the CPU and configured to send data from the CPU to a display means and accept requests and data and route them to the CPU, (c) a weighing means connected to the CPU via the I/O means and providing a weighing signal corresponding to the mass of the food item being weighed, (d) data input means connected to the CPU via the I/O means and comprising a keypad for entering food content information and command requests, and a bar code reader for scanning the bar codes from packaged foods, and (e) a display means connected to the CPU via the I/O means and providing visual display of food content information and computed nutritional results.

The dietetic scale of the present invention enables the user to weigh and calculate the nutritional content of a food item to be consumed, cumulatively sum the results with the nutritional contents from the foods previously consumed that day, and then compare this total with the recommended daily limits/requirements. In this manner, an individual may tailor his food content intake to achieve a desired nutrition goal. In order to do so, the food item to be consumed is weighed and the nutrition data associated with that food item is entered into or accessed from the device such that the appropriate nutritional results may be calculated for the metered quantity of food.

Accordingly, the weighing means may comprise a weighing platform upon which a container, such as a bowl, may be supported and "zeroed" out, by a button on the keypad or other means, such that the weigh signal sent to the CPU is nullified. By providing a "zeroing" function, any variety of kitchen containers may be conveniently used with the device and not just one container of a known weight. The food portion to be consumed may then be placed in the bowl in preparation for the food's nutritional content data entry.

As mentioned previously, manufacturers are required by law to provide specified food content and nutrients, as well as recommended daily nutrient and caloric input, and present them in a standard format on the package's "Nutrition Facts" information panel. Based on this fact, a three-tiered means of food content data entry/access has been developed which is convenient, simple, and rapid to use. In addition, this three tiered means functions regardless of whether the food is "conventional" or processed.

At the first level, a manual data entry mode is provided which operates with packaged processed foods. In manual data entry mode a Serving Template Display may appear on the display means, the template comprising a predefined listing of food content categories and associated blank fields to which the appropriate food content data may be manually supplied via the input means keypad. The predefined listing of food content items may comprise a variety of nutritional items such as unit serving size, total calories, total fat, protein, vitamin A, and so forth. Although a variety of content items and formats may be used, it is preferable that the template be modeled based on the standardized "Nutrition Facts" label format. By so doing, the user may conveniently reference and follow the "Nutrition Facts" label while inputting the data, and once the data is entered, the label and template may be easily compared for accuracy. By basing the template on the "Nutrition Facts" label, the user is assured that all the required nutritional information for the food product is available since manufacturers are required by law to provide such information. In addition, since the required information is based on FDA research, it is likely that all the substantive food content and nutrients important to good health are included in the food content listing.

The second level of data entry may also operate with packaged processed foods, but in an even quicker and more convenient manner. In this mode, a similar Serving Display Template may appear on the display means. However, rather than entering the data manually, the second level of data entry uses an automated scan mode in which the bar code reader may be used to scan the UPC bar code from the package of the food portion emptied into the bowl. The UPC (Universal Product Code) bar code is a lined, machine-readable symbology which is found on most packaged goods and which relates to a UPC number. Each UPC number then corresponds to a unique product (in terms of content, quantity, and packaging) sold by a manufacturer. Because the UPC code is unique to the product, it may be used to access a database of the nutritional content of the food that may be based on the "Nutrition Facts" label. The nutrition information database may be stored on the device's memory means and updated periodically by a variety of data transfer means such as a floppy disk, flashcard memory device, or uploading files from an Internet web site. By scanning the bar code, the CPU may access the nutrition database and automatically fill the blank entries in the Serving Display Template. The accuracy of the data may be verified by comparing the display template data with the "Nutrition Facts" label on the food's package. If the template data is incorrect, or if the UPC barcode is not available for the product, the user may resort back to the manual mode of data entry.

The third level of data entry is an automated code mode, which operates on foods for which a "Nutrition Facts" label is not available. As mentioned previously, the labeling of "conventional" foods such as fresh vegetables and unprocessed meat is voluntary, thus many of these types of foods have no packaging or "Nutrition Facts" label. However, the "Nutrition Facts" information is published by the U.S. government for virtually all such foods, and a database of this information may be stored on the memory means of the present invention. Using the automated code mode, a unique code, representing the food item placed in the bowl, may be entered via the keypad. The code may then be used by the CPU to access the stored database of nutrition information and fill in the blank entries on the Serving Template Display. For example, if "lean hamburger" is placed in the bowl and its unique code is 101, then "101" would be entered into the keypad and the nutrition information for "lean hamburger" would be automatically entered into the template. A listing of the codes and corresponding food item may be included in a reference booklet provided with the device. Alternatively, a searchable database of the codes and corresponding food items may be provided in the invention's memory means and accessed via the keypad. In some embodiments, the code may be substituted with or used conjunctively with a named entry in which the noun name of the food item is entered to access and load the nutrition information.

Once the appropriate means for entering the nutritional data has been established and executed, the data will reside in the data entry fields of the Serving Template Display. The weight of the food sample in the bowl may then be automatically loaded into the template either by issuing the correct command from the input means keypad or, alternatively, the value may be supplied instantaneously during the weighing process without user interaction. Typically, the template data will be based on the unit weight of the standard "serving size" as listed on the "Nutrition Facts" label or in the published data provided by the U.S. government. The weight of the standard "serving size" may also reside in the template, providing means for the CPU to appropriately scale the individual nutrition datum for food portion being weighed. By issuing the correct command from the keypad, the CPU may then process and display the nutrition data results, providing a readout of all nutritional categories for that particular serving of food. This enables the user to see what is actually being consumed and allows him/her to adjust the portion according to his prescribed diet.

A second template, a Limit Template Display, may also appear on the display means, providing the user with the cumulative substantive content for all foods consumed that day and comparing these values with the recommended daily limits/requirements. The cumulative totals may be acquired by calculating and storing the sum of the present food item results and the stored results of all previously consumed foods.

The recommended daily limits/requirements consist of data developed by the FDA based on expert dietary advice about how much, or how little, of some key nutrients a person should eat each day. The values vary according to one's recommended daily calorie consumption, but the FDA uses a reference value of 2000 calories per day and requires data based on this value to appear on the "Nutrition Facts" label. The 2000 calories per day recommended daily limits/requirements for each nutrient category may be stored on the memory means and accessed for display and comparison on the Limit Template Display. As an optional feature, additional recommended daily limits/requirements for a specific number of calories per day may be acquired from readily available government sources and stored in a database on the memory means. The user may then optionally enter his personal recommended calories per day, if known, and retrieve specific recommended daily limits/requirements for their particular diet. An additional option feature may be to allow each of the recommended daily limits/requirement values to initially default to the FDA proposed reference values for a 2000 calorie daily intake, but allow the daily limits/requirement values to be individually altered by the user to meet specific dietary needs. For instance, if the user is on a low sodium diet, the daily limit for sodium could be adjusted down from the value proposed for a normal 2000 calorie per day diet.

The format for presenting the recommended daily limits/requirements on the Limit Template Display may vary. Certain embodiments may simply present the limit/requirement values so that the user may mentally compare his cumulative daily results with the recommended daily values and adjust his consumption accordingly. Other embodiments may initially present the limit/requirement values and then automatically subtract from that value each time the user utilizes the scale and consumes a weighed portion of food. By this method, the device provides a visual indication of the how close the dieter is to surpassing the limiting items, such as fat, sodium, and cholesterol, which the FDA recommends not be exceeded, and how far the dieter is from achieving the required consumption of elements, such as vitamins, calcium, and iron, which the FDA suggests we do not get enough of. As an additional, optional feature, an alarm means may be associated with the Limit Template Display. The alarm means may comprise a visual, audible, or other indicator that informs the dieter that the limits are being approached, have been met, or have been exceeded.

The invention, together with further aspects and advantages thereof, may be further understood by reference to the following detailed description and accompanying drawings.

BRIEF DESCRIPTION OF THE DRAWINGS

FIG. 3 is a sample Serving template display of the electronic dietetic scale of FIG. 1, showing the data fields in their "zeroed" state;

FIG. 5 is a sample Serving template display of the electronic dietetic scale of FIG. 1, showing the updated "Content Per Unit Serving" column after the nutrient data has been entered by the user;

FIG. 6 is a sample Serving template display of the electronic dietetic scale of FIG. 1, showing the updated data fields after the food sample has been weighed;

FIG. 7 is a sample Limit template display of the electronic dietetic scale of FIG. 1, showing the data fields in their "zeroed" or "reset" state; and FIG. 8 is a sample Limit template display of the electronic dietetic scale of FIG. 1, showing the updated data fields after the ADD key has been pressed by the user.

DETAILED DESCRIPTION

Figure 1:
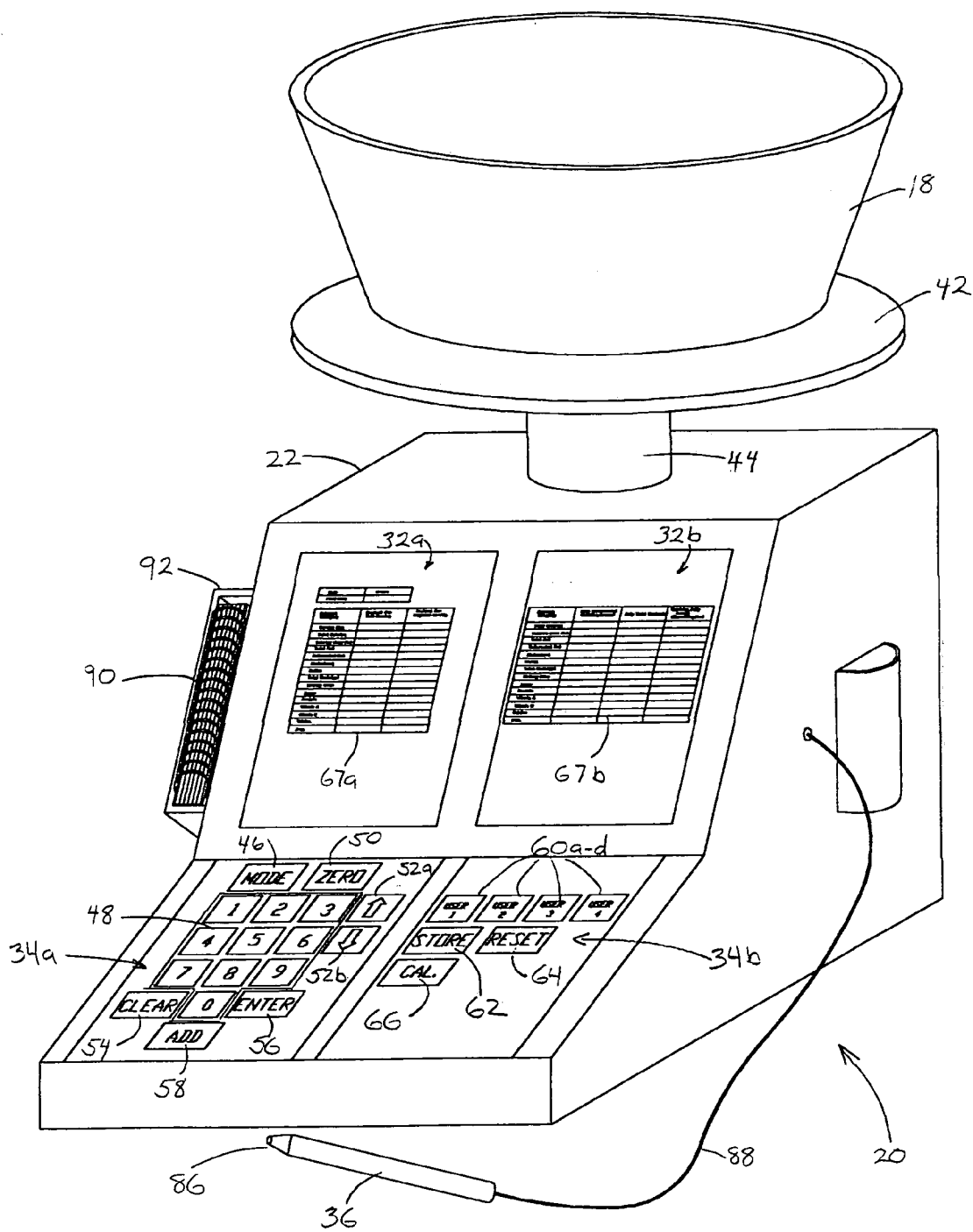
FIG. 1 is a perspective view of an electronic dietetic scale in accordance with the present inventions, with a food container readied for weighing a food portion.
Figure 2:
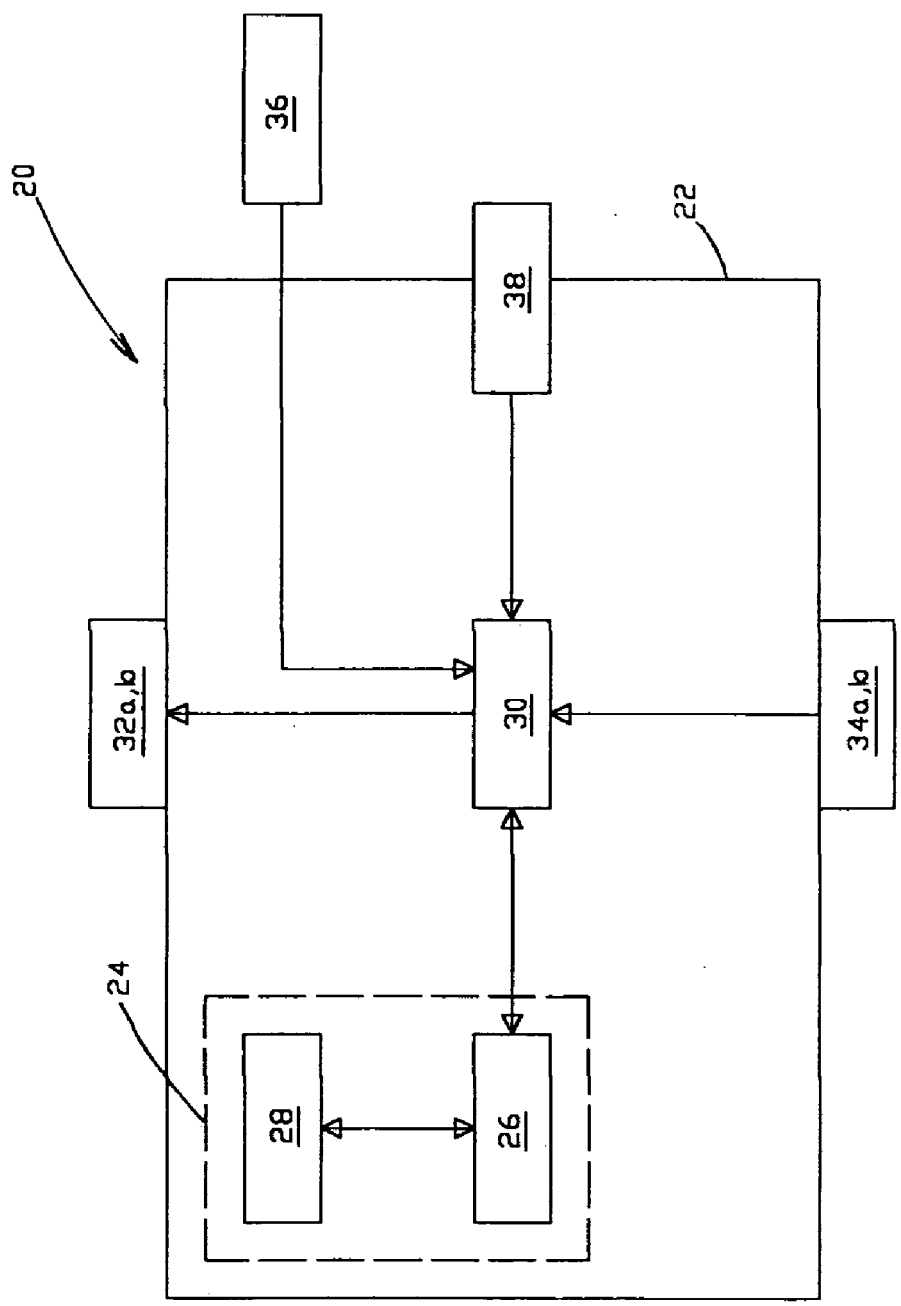
FIG. 2 is a block diagram of the electronic dietetic scale of FIG. 1.

Referring to FIGS. 1–2, a preferred embodiment of a dietetic scale 20 in accordance with the present invention is shown. The scale includes external casing 22 which houses means for the computation, retrieval and storage of nutrition data and instructional command sequences in the form of a computer 24, the computer being integrated in the form of a microprocessor chip, and comprising a central processing unit (CPU) 26, and memory means 28 comprising read only memory (ROM) and random access memory (RAM). An input/output (I/O) means 30 is connected to the CPU 26 and is configured to send data from the CPU to the display means 32a, b and accept requests and data from the input means keypad 34a, b, bar code reader wand 36, and weighing means 38. In some embodiments a single controller may be used, while in other embodiments multiple or segmented controllers may by employed, depending on economies and other design factors.

The scale 20 further comprises a weighing means 38 comprising a substantially horizontally disposed platter 42 affixed atop a substantially vertically disposed shaft 44 which passes through the casing 22 and is supported by a load cell (not shown) of conventional type and suitably of the strain bridge variety. The load cell is housed within the casing 22 and configured to provide a weigh signal to the CPU 26 via the I/O means 30.

The input means keypad 34a, b may be disposed in a convenient position on the casing 22, and comprise a plurality of touch sensitive keys that provide data and command requests to the CPU 26 via the I/O means 30. The keys include alphabetic, numeric, and command indicia, which indicate to the user the command request or function that will be performed by depressing the key. It is preferable that the keypad 34a, b be covered with a sheet of compliant, transparent material that allows activation of the keys through the sheet. By this means, the keypad may be protected from the intrusion of food and may be easily wiped clean as needed.

In the preferred embodiment shown in FIG. 1, the keypad 34a,b has been separated into two panels, a Serving keypad panel 34a and a Limit keypad panel 34b, each of which is associated with a specific function. In accordance, the display means 32a,b may be separated into two panels as well, a Serving display 32a and a Limit display 32b, each of which corresponds to the respective keypad panel and displays the information pertaining to that keypad function. By dividing the keypad and display according to function, it is easier for the user to understand and associate the keys required for a specific operation, thus reducing the time and learning curve required for use of the scale. The Serving keypad 34a and Serving Display 32a provide means for entering and viewing nutrient data for a standard unit serving size and then determining the nutrient content for a weighed serving of that food. The Limit keypad 34b and Limit display 32b provide means for retrieving, storing, modifying, and viewing the user's recommended daily limits/requirements as well as the total nutrient content of all food consumed during the day.

The Serving and Limit displays may be provided on separate panels as shown, or in the interest of economy a single panel switchable by means of a microcontroller or the like may be employed. Suitable display panels include, for example, character and bit-map LCD panels; bit-map LCD panels offer the flexibility of displaying symbols, (for example, as discussed below) whereas character LCD panels generally have the advantage of lower cost.

The Serving keypad 34a includes a MODE key 46 that tells the CPU 26 which method of data input will be used. The MODE key 46 may operate by toggling, using repeated depression of the key, through a selection of three data input modes, (a) Manual Mode, in which the data for each nutrient category is entered manually using the numerical keys 48, (b) Scan Mode, in which the data is input automatically by scanning the UPC bar code on the food package using the bar code reader wand 36, and (c) Code Mode, in which a unique food number is entered using the numerical keys 48 to access and automatically load the data for the specified food.

In addition, the Serving keypad 34a includes the following keys, (a) a ZERO key 50 which allows the user to "ZERO" out the weighing means 38 after an empty food container or bowl 18 has been placed on the weighing platter 42, thus allowing any convenient container to be used for weighing a food portion regardless of the container's weight, (b) numerical keys 48 numbered 0–9 for entering the food content data in a specific nutrient category field on the Serving display 32a (c) Up Arrow 52a and Down Arrow 52b keys for moving a cursor between nutrient category fields on the Serving display 32a when data is being entered, (d) A CLEAR key 54 which may be used to clear information from the data entry and results fields of the Serving display 32a, (e) an ENTER key 56, for use with Scan Mode or Code Mode, which tells the CPU 26 that the UPC bar code has been scanned or the food code has been entered, respectively, and instructing the CPU to retrieve and enter the stored nutrient content data for a standard unit serving into the appropriate data entry fields, (f) an ADD key 58 which takes the nutrient content of a weighed serving as displayed on the Serving display 32a, and adds/subtracts it to/from the cumulated nutrient content results on the Limit display 32b.

The Limit keypad 34b includes the following keys, (a) at least one, and preferably four, numbered USER keys 60a–d, each of which may be assigned to an individual user for accessing their personal stored daily limits/requirements and cumulated daily totals for consumed nutrients, (b) a STORE key which allows newly updated cumulated daily totals to be stored to memory 28, (c) a RESET key 64 which may be pressed at the beginning of each new day to "reset", or "zero", the cumulated daily totals, (d) A CAL. key 66 which allows the daily calorie level, and corresponding recommended daily limits/requirements, to be varied from the 2000 calorie FDA reference value in order to accommodate specific individual health requirements.

Figure 4:
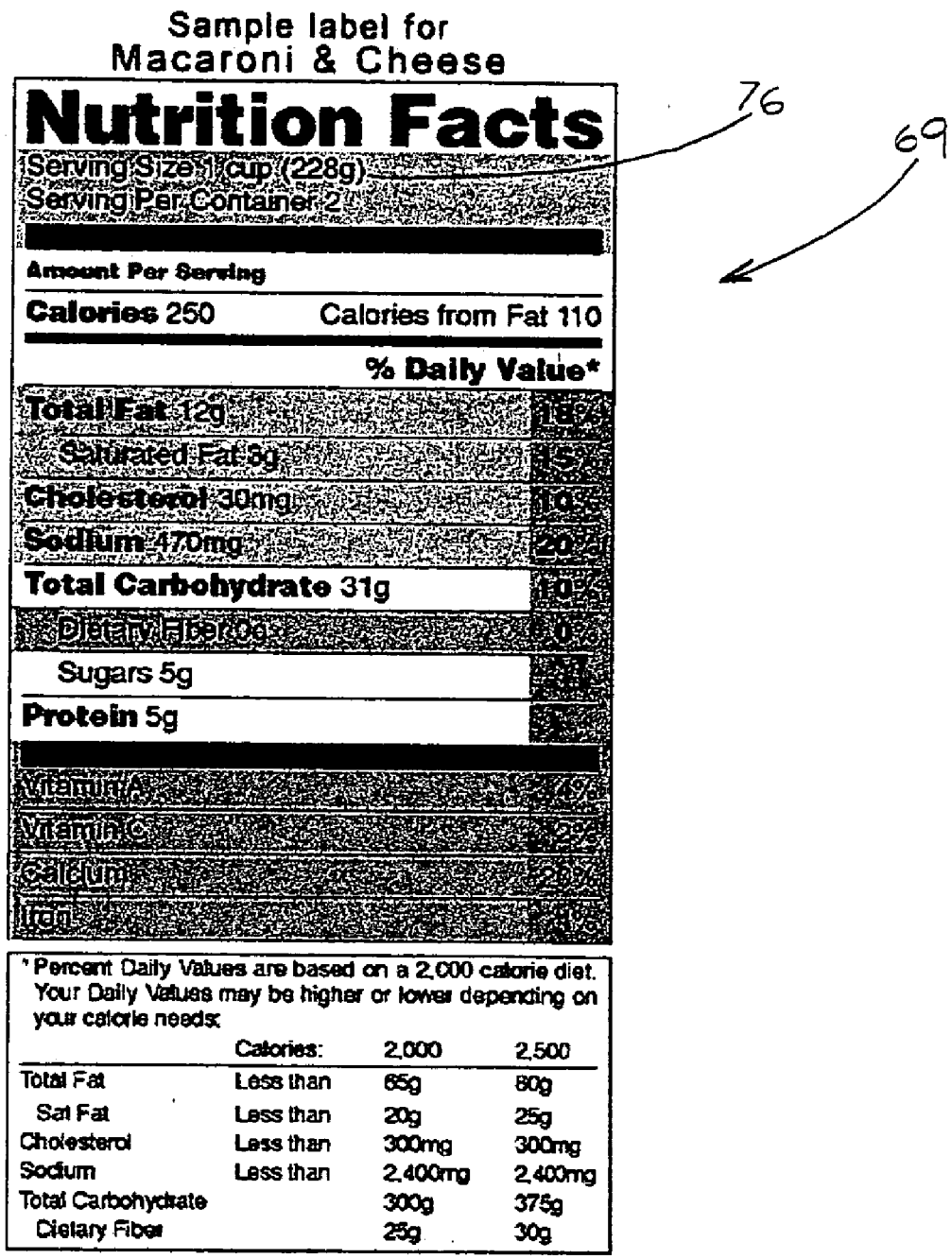
FIG. 4 is a sample "Nutrition Facts" label for macaroni and cheese.

Information input through the various input means and results computed by the CPU 26 is displayed on the Serving display 32a and Limit display 32b in the form of display templates 67a, b. Prior to entering any nutrient data, the Serving template 67a may appear as shown in FIG. 3. The main Serving Template table comprises three columns, the first column being a "Nutrient Category" column 68 which provides the headings for the various food content categories in accordance with the "Nutrition Facts" label. FIG. 4 provides a sample "Nutrition Facts" label 69 for macaroni and cheese, which is used as an example in the discussion that follows. Included next to most categories in the "Nutrient Category" column 68 is a units label 70a–c that tells which unit of measure is being used with each category. In general the unit labels are units of mass such as grams (g) 70a or milligrams (mg) 70b, however for the vitamin, calcium, and iron categories the values are expressed in terms of daily percentages (%) 70c. This is done to remain in accordance with the "Nutrition Facts" label and make it easier for the user to enter data directly from packaged foods. Also Included next to each category in this column is a symbol 72a, b indicating whether the nutrient category is one which the FDA suggests people get too much of (••) 72a, and should therefore be "cut" or limited, or one which people generally do not get enough of (▨) 72b, and is therefore required to maintain good health; it will be understood that the indicator symbols may not be a feature of all embodiments, particularly in those using character panel displays, and alternative indicators may be employed.

The "Unit Serving" column 74 provides the user with data entry fields that correspond to the categories in the "Nutrient Category" column 68. Data entries into this column are made with reference to a standard unit serving size, as indicated by the "Serving Size" 76 listed on the sample "Nutrition Facts" label 69 of FIG. 4. The standard unit serving size data is entered into the unit "Serving Size" field 75. This data, as well as the other data in this column, may be entered manually by moving up or down to the chosen field in the column using the respective Up Arrow 52a or Down Arrow 52b key on the Serving keypad 34a and then typing in the correct value using the numeric keys 48. By scrolling to the next field, the value for the data entered will be "set", and subsequent data may be entered. Because the Serving template 67a follows the "Nutrition Facts" label format, data entry can be performed quickly and conveniently by sequentially following the listings on the "Nutrition Facts" label. When all the required data has been entered into the appropriate fields of the "Unit Serving" column 74, the Serving template will appear as shown in FIG. 5.

The "Weighed Serving" column 78 provides the user with feedback on the nutrient content of the weighed portion of food to be consumed. The data residing in the weighed "Serving Size" field 80 of this column represents the mass of this weighed portion and is provided automatically by the weighing means 38. In normal operation, a user would place an empty food bowl 18 on the weighing platter 42 and "zero" out the weight using the ZERO key 50 on the Serving keypad 34a. When this is done, the weighed "Serving Size" field 80 will read "0" representing no mass. The food portion is then be placed in the bowl 18, and the weighed "Serving Size" field 80 will automatically update with the actual mass of the food. This mass value may then be used by the CPU 26, in conjunction with the unit "Serving Size" mass 75, to calculate the ratio of weighed serving to unit serving. The CPU then multiplies each category in the "Unit Serving" column 74 by this ratio and presents the resulting values in the corresponding field of the "Weighed Serving" column 78. The results of this calculation and the resulting Serving template 67a display are shown in FIG. 6. The CPU 26 may be configured to continuously monitor the weighing means 38 output after it is "zeroed" and continuously and automatically update all fields in the "Content Per Weighed Serving" column 78. By this procedure, the user receives continuous feedback on the nutrient content in the bowl 18, and the food quantity in the bowl may be increased or decreased "on the fly" until the portion remaining in the bowl 18 contains the desired nutrient content.

As discussed previously, the MODE key 46 selects the method of data entry by toggling through three available choices; Manual Mode, Scan Mode, and Code Mode. The selected data entry mode is displayed in the "Mode" field 82 of the Serving template 67a. In the example embodiment, this field indicates "Manual" mode, which operates according to the procedures described in the previous discussion. Typically, Manual Mode would be the default and may be used to enter data manually for any packaged food. If Scan Mode or Code Mode were desired, the MODE key 46 would be toggled until the appropriate mode appeared in the "Mode" field 82. If either of these alternative modes is selected, the "Food Code/UPC Code" field 84 will highlight and the user can begin the procedures for that mode.

Scan Mode may be selected if the package on the food to be consumed contains a UPC barcode. If Scan Mode is selected, "Scan" will appear in the "Mode" field 82 and the "Food Code/UPC Code" field 84 will highlight. The user may then swipe the barcode on the package using the tip 86 of the barcode reader wand 36. The barcode reader wand 36 may be of a conventional optical type and may be configured to communicate with the CPU 26 via a cable 88 connected to the I/O means 30; in some embodiments the bar code reader may be a stationary type rather than a word, with the optical sensor mounted behind a window in the casing. Once the barcode is swiped, the associated UPC number will appear in the "Food Code/UPC Code" field 84. This number may be used to verify the UPC number listed on the packaging below the barcode. If the numbers do not correlate, the user may switch back to Manual Mode and proceed. If the user is satisfied with the correlation, the ENTER key 56 may be pressed which directs the CPU 26 to retrieve the nutrient content data from memory 28 and enter it in the appropriate fields of the "Unit Serving" column 74. At this point, the Serving template 67a will appear identical to that shown in FIG. 5, and the remaining procedure is identical to that previously discussed. The "Unit Serving" column 74 may be compared with the "Nutrition Facts" label to verify accuracy and individual data fields may be modified if necessary.

If the food to be consumed is the "conventional" type, such as fresh vegetables or pork chops, Code Mode must be used to enter the nutrient data. By selecting Code Mode with the MODE key 46, "Code" will appear in the "Mode" field 82, and the "Food Code/UPC Code" field 84 will once again highlight. A spiral bound reference booklet 90 listing the various "conventional" foods, preferably in alphabetical order, and associated food codes may be provided with the invention and stored in a convenient holder slot 92. The user may consult this reference booklet and enter the appropriate code in the "Food Code/UPC Code" field 84. The ENTER key 56 may then be pressed which will direct the CPU 26 to retrieve the nutrient content data from memory 28 and enter it in the appropriate fields of the "Unit Serving" column 74. Once again, at this point, the Serving template 67a will appear identical to that shown in FIG. 5, and the remaining procedure is identical to that previously discussed.

Regardless of which data entry method is used, once the "Unit Serving" column 74 of the Serving template 67a is filled, the "Weighed Serving" column 78 will be automatically updated by the CPU and the user may proceed to the Limit template 67b on the Limit display 32b. The Limit template 67b may default to the display shown in FIG. 7. Before any operation, the user must identify himself by pressing his dedicated USER key 60a–d. Although four USER keys 60a–d are provided, for users 1 through 4, an alternate number of keys may be supplied or a different method of user selection may be adapted. The USER key tells the CPU 26 to load or store the data associated with a particular individual, and that user's number will appear in the "User" field 94 for verification. If no food has yet been consumed that day, the RESET key 64 on the Limit keypad 34b should be pressed to "zero" and "reset" the cumulative daily totals from the previous day.

On the Limit template 67b, the "Nutrient Category" column 96 is identical to the "Nutrient Category" column 68 in the Serving template 67a except that the "serving size" is omitted. The next column, the "Daily Recommended Limit/Requirement" column 98 contains the FDA recommended limit or requirement for the corresponding nutrient categories in the "Nutrient Category" column 96. These values are based on the daily recommended calories listed in the "Total Calories" field 100, which defaults to the FDA reference value of 2000 calories. The data for the fields in this column are automatically retrieved from memory 28 for the specified user and displayed in the template by the CPU 26.

The next column, the "Daily Total Content" column 102, gives the cumulative daily nutrient content in each nutrient category for the specified user. Initially this column will be "zeroed" after hitting the RESET key 64. However, by pressing the ADD key 58 on the Serving keypad 34a, the fields in this column will be updated with the nutrient content for the food portion being weighed. FIG. 8 shows the updated Limit template 67b for the macaroni and cheese example. The CPU updates the "Daily Total Content" column 102 by adding the value in each field of the "Weighed Serving" column 78 on the Serving template 67a to the corresponding field in the "Daily Total Content" column 102 of the Limit template 67b. The values in the "Daily Total Content" column 102 thus identify the total cumulative nutrients consumed that day. These may then be compared with the recommended levels listed in the "Daily Recommended Limit/Requirement" column 98.

The last column, the "Remaining Daily Amount Allowed/Required" column 104, tells the user how much of each nutrient may or should be consumed before reaching the levels indicated in the "Daily Recommended Limit/Requirement" column 98. Initially, as shown in FIG. 7, this column will be "reset" to the values listed in the "Daily Recommended Limit/Requirement" column 98 after hitting the RESET key 64. However, by pressing the ADD key 58 on the Serving keypad 34a, the fields in this column will be updated with the nutrient content for the food portion being weighed. This is shown in FIG. 8. The CPU updates the "Remaining Daily Amount Allowed/Required" column 104 by subtracting the value in each field of the "Weighed Serving" column 78 on the Serving template 67a from the corresponding field in the "Remaining Daily Amount Allowed/Required" column 104 of the Limit template 67b. When the scale is used later to weigh another portion of food, the "Weighed Serving" output can be conveniently compared with this column to see if the portion will put the person over the limit. The food portion can thus be modified before eating it.

Some form of alarm indicator may identify which limit categories have been exceeded and which requirement categories remain to be achieved. For example, the  symbol 72a may flash next to the appropriate limit category when the user approaches or exceeds the daily limit of this nutrient, and the  symbol 72b may flash continuously next to a requirement category until that nutrient level has been reached.

Once the user has updated the Limit template 67b and is satisfied with the results, the cumulated data may be stored back in memory 28 by pressing the STORE key 62 on the Limit keypad 34b. The cumulated data may then be retrieved and updated when the next food portion is weighed and consumed.

As mentioned previously, the data in the Limit template 67b is based on the default reference value of 2000 calories per day. The CAL. key 66 allows the user to change this reference value to a particular daily calorie intake which suits the users specific dietary requirements. When the CAL. key is pressed, the "Total Calories" field 100, in the "Daily Recommended Limit/Requirement" column 98, will highlight, allowing the user to enter a new value using the numeric keys 48. When the desired value has been entered, the user presses the CAL. key again. By so doing, the value will be stored and the CPU 26 will retrieve the corresponding limit/requirement data and update all the data on the Limit template 67b based on this new reference value. The new daily calorie limit will remain in effect until changed once again by the user. As an option, additional keys and/or functions may be added to the invention, which allow other fields in the "Daily Recommended Limit/Requirement" column 98 to be individually modified by the user. This would allow, for instance, a person on a low sodium diet, to reduce the 2400 mg sodium limit to 1800 mg while maintaining a daily calorie limit of 2000.

The scale assembly may optionally be provided with means for outputting stored user data to a peripheral device or separate computer, e.g., so that this data can be read or analyzed by a health professional. For example, flash memory may be used to retain the user info/history, so that this can be subsequently removed and taken to a physician or nutritionist having a PC or peripheral capable of reading the memory card. The health professional is thus able to evaluate the history and advise the user accordingly; moreover, in some embodiments the health care provider may revise/update the daily limits or other stored data by entering this on the flash memory so that the revisions are implemented when the card is reinserted in the scale. Transmission of user info/history data can also be performed via modem, the Internet, or other suitable means. Moreover, it will be understood that the scale assembly itself may be provided with onboard hardware/software that enables it to communicate with peripherals and/or PC by any suitable means, such as by social interface, parallel port, USB, Ethernet, Firewire™ connection, wireless network, and, so on.

It is to be recognized that various alterations, modifications, and/or additions may be introduced into the constructions and arrangements of parts described above without departing from the spirit or ambit of the claims of the present invention.

What is claimed is:

1. A dietetic scale, comprising:
    a bar code reader for identifying a food product contained in a package from a bar code displayed thereon;
    means for retrieving predetermined food content data per unit weight of said food product from a database containing predetermined food content data per unit weight for a plurality of food products, said predetermined food content data comprising a compilation of standardized nutrition facts promulgated for said food products;
    a scale for determining a measured weight of a serving of said food product obtained from said package; and
    means for comparing said measured weight of said serving of said food product with said predetermined food content data per a unit weight of said food product so as to calculate a nutritional content of said serving of said food product, said means for comparing said measured weight with said predetermined food content data per unit weight of said food product comprising electronic memory having said predetermined food content data for a plurality of food products entered therein.

2. The dietetic scale of claim 1, further comprising:
    means for cumulatively summing calculated nutritional contents of a plurality of servings of food products.

3. The dietetic scale of claim 2, wherein said means for cumulatively summing said calculated nutritional contents of a plurality of servings of food products comprises:
    means for cumulatively summing said calculated nutritional contents over a predetermined interval of time.

4. The dietetic scale of claim 3, further comprising:
means for comparing said calculated nutritional contents that are cumulatively summed over said predetermined interval of time with a predetermined goal for intake of said nutritional contents for said interval of time.

5. The dietetic scale of claim 4, wherein said predetermined goal for intake of said nutritional contents includes predetermined minimums and maximums for selected nutritional contents for said predetermined interval of time.

6. The dietetic scale of claim 5, wherein said means for comparing said cumulatively summed contents with said predetermined goal comprises:
an electronic memory for storing said predetermined goal for intake of said nutritional contents; and
a computer processor for comparing said summed nutritional contents with said predetermined minimum and maximum of said predetermined goal so as to calculate differences between said summed nutritional contents and said predetermined goal.

7. The dietetic scale of claim 6, further comprising:
means for visually displaying at least said calculated nutritional contents.

8. The dietetic scale of claim 7, wherein said means for visually displaying said values comprises:
at least one LCD panel.

9. The dietetic scale of claim 6, further comprising:
means for outputting at least said differences between said summed nutritional contents and said minimums and maximums of said predetermined goal to electronic storage media for subsequent retrieval and analysis.

10. The dietetic scale of claim 9, wherein said electronic storage media comprises digital flash card media.

11. The dietetic scale of claim 1, further comprising:
means for manually entering said food content data for said food products.

12. The dietetic scale of claim 11, wherein said means for manually entering said food content data comprises a manually operable keypad.

13. The dietetic scale of claim 1, wherein said means for weighing a serving of said food product comprises a strain bridge having an electronic output.

14. The dietetic scale of claim 1, wherein said bar code reader comprises:
a bar code scanner mounted in a wand attached to a housing of said scale.

15. The dietetic scale of claim 1, wherein said bar code reader comprises a stationary bar code scanner mounted behind a window in a housing of said scale.

16. A method for calculating a nutritional content of a serving of a food product, said method comprising the steps of:
scanning a bar code on a package so as to identify a food product contained therein;
retrieving predetermined food content data per unit weight of said food product from a database containing predetermined food content data per unit weight for a plurality of food products, said database comprising a compilation of standardized nutrition facts promulgated for said food products;
weighing a serving of said food product from said container so as to determine a measured weight of said serving; and
comparing said measured weight of said serving of said food product with said predetermined food content data per unit weight of said food product so as to calculate a nutritional content of said serving of said food product.

17. The method of claim 16, further comprising the step of:
cumulatively summing said calculated nutritional contents of a plurality of servings of food products over a predetermined interval of time.

18. The method of claim 17, further comprising the step of:
comparing said calculated nutritional contents that are cumulatively summed for said predetermined interval of time with a predetermined goal for intake of said nutritional contents for said interval of time, so as to calculate differences between said summed nutritional contents and predetermined minimums and maximums for selected nutritional contents within said goal.

19. The method of claim 18, further comprising the step of:
outputting at least said differences between said summed nutritional contents and said maximums and minimums of said predetermined goal to electronic storage media for subsequent retrieval and analysis.

20. A dietetic scale comprising:
a bar code reader for identifying a food product contained in a package from a bar code displayed thereon;
means for retrieving predetermined food content data per unit weight of said food product from a database containing predetermined food content data per unit weight for a plurality of food products;
a scale for determining a measured weight of a serving of said food product obtained from said package;
means for comparing said measured weight of said serving of said food product with said predetermined food content data per a unit weight of said food product so as to calculate a nutritional content of said serving of said food product, said means for comparing said measured weight with said predetermined food content data per unit weight of said food product comprising electronic memory having predetermined food content data content for a plurality of food products entered therein;
means for cumulatively summing said calculated nutritional contents of a plurality of servings of food products over a predetermined interval of time; and
means for comparing said calculated nutritional contents that are cumulatively summed over said predetermined interval of time with a predetermined goal for intake of said nutritional contents for said interval of time, said predetermined goal for intake of said nutritional contents including predetermined minimums and maximums for selected nutritional contents for said predetermined interval of time.

21. The dietetic scale of claim 20, wherein said means for comparing said cumulatively summed contents with said predetermined goal comprises:
an electronic memory for storing said predetermined goal for intake of said nutritional contents; and
a computer processor for comparing said summed nutritional contents with said predetermined minimum and maximum of said predetermined goal so as to calculate differences between said summed nutritional contents and said predetermined goal.

22. The dietetic scale of claim 21, further comprising:
means for visually displaying at least said calculated nutritional contents.

23. The dietetic scale of claim 22, wherein said means for visually displaying said values comprises:
at least one LCD panel.

24. The dietetic scale of claim 21, further comprising:
means for outputting at least said differences between said summed nutritional contents and said minimums and maximums of said predetermined goal to electronic storage media for subsequent retrieval and analysis.

25. The dietetic scale of claim 24, wherein said electronic storage media comprises digital flash card media.

26. A method for calculating a nutritional content of a serving of a food product, said method comprising the steps of:
scanning a bar code on a package so as to identify a food product contained therein;
retrieving predetermined food content data per unit weight of said food product from a database containing predetermined food content data per unit weight for a plurality of food products;
weighing a serving of said food product from said container so as to determine a measured weight of said serving;
comparing said measured weight of said serving of food product with said predetermined food content data per unit weight of said food product so as to calculate a nutritional content of said serving of said food product;
cumulatively summing said calculated nutritional contents of a plurality of servings of food products over a predetermined interval of time; and
comparing said calculated nutritional contents that are cumulatively summed for said predetermined interval of time with a predetermined goal for intake of said nutritional contents for said interval of time, so as to calculate differences between said summed nutritional contents and predetermined minimums and maximums for selected nutritional contents within said goal.

27. The method of claim 26, further comprising the step of:
outputting at least said differences between said summed nutritional contents and said maximums and minimums of said predetermined goal to electronic storage media for subsequent retrieval and analysis.

* * * * *